Feb. 6, 1951     E. H. PIRON     2,540,832
WHEEL SPOKE

Filed Dec. 1, 1943     2 Sheets-Sheet 1

Inventor
EMIL H. PIRON,
By Hudson Davis
Attorney

Feb. 6, 1951 E. H. PIRON 2,540,832
WHEEL SPOKE
Filed Dec. 1, 1943 2 Sheets-Sheet 2

Inventor
EMIL H. PIRON,

By Mudson Davis
Attorney

Patented Feb. 6, 1951

2,540,832

UNITED STATES PATENT OFFICE

2,540,832

WHEEL SPOKE

Emil H. Piron, New York, N. Y., assignor to Transit Research Corporation, New York, N. Y., a corporation of New York Application December 1, 1943, Serial No. 512,502

6 Claims. (Cl. 295—14)

This invention relates to spokes for resilient wheels and has particular adaptability for use on rail vehicles such as street cars, although other uses are contemplated.

Present conventional wheels under the new type street cars incorporate rubber inserts between the hub and tread surface. Such wheels have proven very satisfactory from the standpoint of quietness of operation. They also make it possible to employ an axle assembly of improved type. The disadvantages of rubber are that it is comparatively expensive and that, in the present emergency, the manufacturers are unable to supply the demand. It is an object of this invention to provide a resilient wheel made wholly of metal, which will have quietness of operation entirely comparable to that of the wheels employing rubber inserts, which will be more economical of manufacture and which will have increased deflection thereby giving improved riding quality.

A wheel of the general type herein contemplated is shown and described in my co-pending application Serial #491,214 filed June 17, 1943, now abandoned. This invention is an improvement over the wheel of that application principally as a result of an improved spoke construction. The spoke herein shown increases the deflection of the tread surface with respect to the hub, under similar loading, without increasing the stresses in the spoke sections where greatest stresses occur—namely, at the ends of the active parts of the bars forming the spokes. The wheel will thus give improved riding quality and will have less weight without sacrifice of strength.

More particularly, the principal object of this invention is to provide a multipart wheel spoke comprising parallel bars adapted to flex in response to relative loading of the hub and tread surface and of such formation as to resist bending substantially uniformly along their length, and, further to provide a formation which will closely approach this ideal but which may be readily and economically manufactured.

Figure 1:
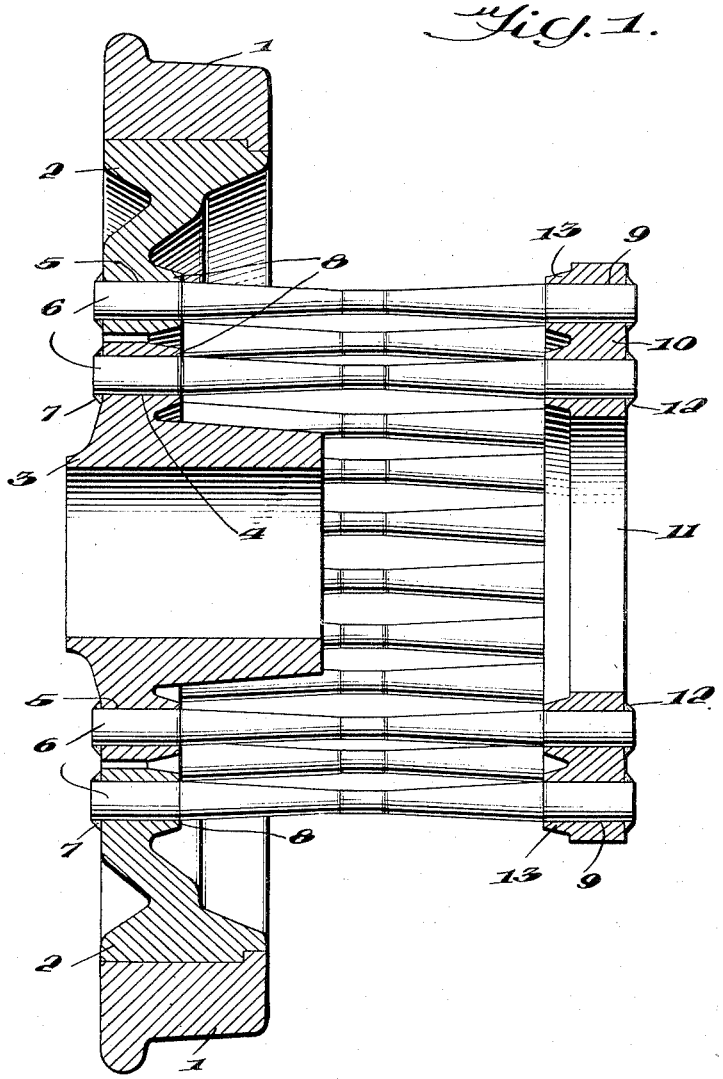
Figure 2:
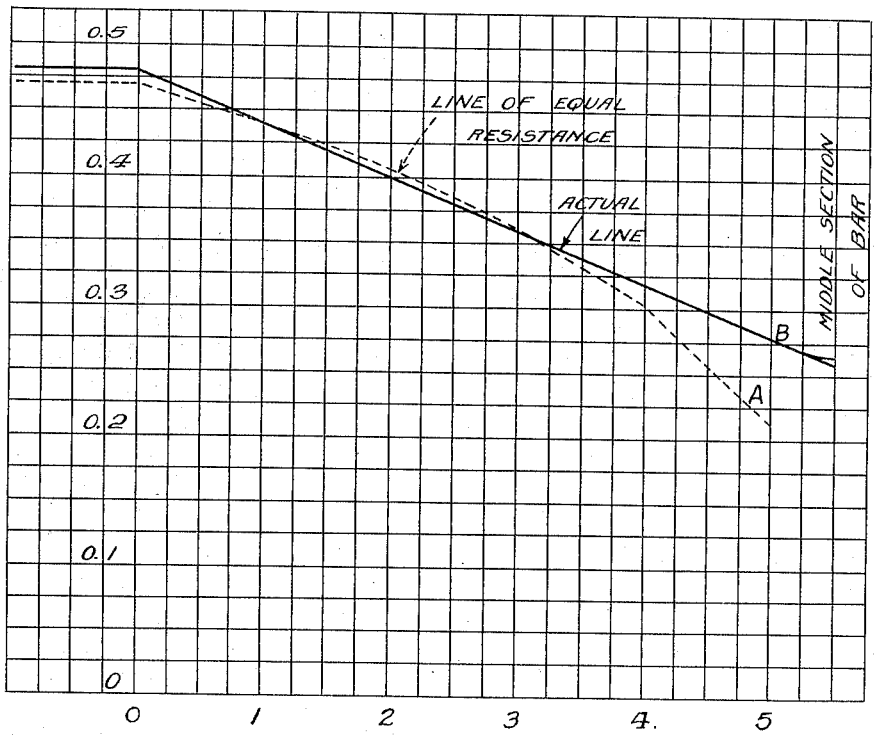
Figure 3:
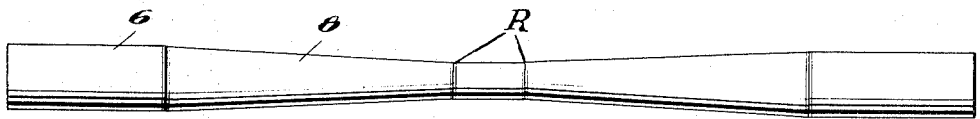

Other objects and advantages will become hereinafter more fully apparent as reference is had to the accompanying drawings in which Figure 1 is a longitudinal diametric section through a wheel constructed according to my invention, Figure 2 is a diagram, somewhat exaggerated, showing the ideal curve of equal resistance to bending as compared with the selected shape of the spoke of my improved wheel, and Figure 3 is an elevational view of my improved spoke.

More particularly, 1 indicates the tire or tread surface which is shrunk onto the rim portion 2. The hub 3 has a radial flange 4 which is concentric with and of somewhat less outside diameter than the inside diameter of the rim portion 2. The flange 4 and the rim portion 2 are both contained within the contour of the tire 1 and also within the contour of the hub 3.

The flange 4 and rim portion 2 are each provided with a series of holes 5, the holes of each series being equally spaced about the axis of the hub 3 and hence the two series are concentric. There are the same number of holes in each series. Through these holes 5 half spokes 6 are inserted. A small portion of the end of each half spoke projects through the flange and rim portion respectively and is welded thereto at 7. A tapered portion or collar 8 follows outwardly along each half spoke on the side of the flange and rim portion away from the weld, the half spokes being secured only at the points of weld.

The half spokes 6 are all parallel and of equal length and each extends through holes 9 in a common ring 10 having a central opening 11 through which an axle may extend. The half spokes 6 extend entirely through the ring 10 and are welded thereto at 12 at their ends. The ring 10 is provided with collar portions 13 which extend outwardly along each half spoke, the same in construction as the collars 8, and the half spokes are secured to the ring only at the points of weld.

The half spokes 6 and the ring 10 together constitute the spokes of the wheel. In operation the half spokes are each subjected to bending stresses, as are also the collars 8 and 13. The flexing of the half spokes lends resiliency between the hub and rim portion. The ring 10 is a casting or forging and is not expected to flex except as to its collar portions. These collar portions prevent a concentration of stresses at the points of attachment of the ends of the half spokes.

The spokes 6 are all preferably of identical shape and size, the shape being chosen to give substantially uniform resistance to bending as will now be described. In Figure 2 the dotted line A represents an ideal profile of equal resistance for a beam in bending and in which the ratio M/S is a constant equal to the maximum stress accepted, M being the bending moment and S being the section modulus. In a bar loaded at the ends with the ends fixed in direction, as is the case of the spokes of the wheel herein contemplated, $$M = P(l-x)$$

where M is the bending moment, P is the radial load per spoke, $l$ is half the length of the spoke and $x$ is the distance from one fixed spoke end to the section considered. The section modulus S in the case of a round bar as here contemplated is $$\frac{\pi r^3}{4}$$

A spoke of such ideal profile would be difficult and expensive to manufacture. Furthermore, it is impossible to obtain an absolutely ideal anchorage at the ends thereof with the result that high stresses will occur at those regions. I therefore provide a profile, one half of which is represented by the full line B of Figure 2, a complete spoke of the final shape being illustrated in Figure 3. The full line B varies from the ideal first in that it is a straight line, secondly in that the left end representing the anchorage end of the spoke overruns the ideal line A thus giving greater spoke diameter at the region of anchorage, and thirdly in that it overruns the ideal line in the spoke mid-section to add substantial cross section for juncture to the other spoke section.

It will thus be seen in Figure 3 that the two halves of the spoke are conical or frusto-conical. They are joined together at their small bases by a section which is formed on a radius R which in the case of a ten inch spoke, for instance, may appropriately be about one inch. The scale of the graph indicates suitable proportions of spoke length and diameter, in inches.

Various modifications will suggest themselves to those skilled in the art and I desire to be extended protection within the scope of the appended claims.

What I claim is:

1. The combination in a wheel of a tread surface, a hub, spokes connecting said tread surface and hub in pairs, one member of each of said pairs being connected at one end to said tread surface, the other of said members being connected at one end to said hub, said members being parallel and connected together at their other ends, said spokes each having the general shape of two frusto-cones joined together at their small bases.

2. In a resilient wheel comprising a hub and a rim member resiliently separated by a spoke assembly in which the spokes are positioned normal to the plane of rotation of the wheel and flex in a direction parallel to the plane of the wheel, individual spokes each composed substantially of half sections of frusto-conical shape joined at their small bases to a relatively short common juncture section, and collar portions integral with said hub and rim members through which the ends of said spokes extend, said spokes extending also entirely through said hub and rim member after passing through the respective collar of each thereof, said spokes being resilient and said collars also being resilient to relieve the tendency of said spokes to fracture at the juncture of said spoke with said hub and said rim member.

3. In a resilient wheel comprising a hub and a rim member resiliently separated by a spoke assembly in which the spokes are positioned normal to the plane of rotation of the wheel and flex in a direction parallel to the plane of the wheel, individual spokes each composed substantially of two similar half sections of frusto-conical shape joined at their small bases to a common juncture section, said juncture section being cylindrical and arcuate in side elevation at the region of juncture with the frusto-conical sections.

4. In a resilient wheel comprising a hub and a rim member resiliently separated by a spoke assembly in which the spokes are positioned normal to the plane of rotation of the wheel and flex in a direction parallel to the plane of the wheel, individual spokes each composed substantially of two similar half sections integrally united, each of said half sections having a straight profile which approximates the curve of uniform strength for a beam in bending, said spokes being arranged in two concentric circles with one end of each spoke of one circle extending through a radial flange on said hub and the other end of each thereof extending through a ring and being exteriorly secured thereto, one end of each spoke of the other circle extending through said rim member and being exteriorly attached thereto and the other ends thereof extending through said ring and being exteriorly attached thereto, said hub flange, said rim member and said ring each having collars extending laterally therefrom around said spokes, said collars being yieldable under deflection of said spokes and relieving said spokes of the tendency to fracture at the juncture thereof with said flange, said rim member and said ring.

5. In a resilient wheel comprising a hub and a rim member resiliently separated by a spoke assembly in which the spokes are positioned normal to the plane of rotation of the wheel and flex in a direction parallel to the plane of the wheel, individual spokes comprising two similar half sections integrally united each having a straight profile in which the ratio of the bending moment to the section modulus is approximately a constant.

6. In a resilient wheel comprising a hub and a rim member resiliently separated by a spoke assembly in which the spokes are positioned normal to the plane of rotation of the wheel and flex in a direction parallel to the plane of the wheel, individual spokes comprising two similar substantially half sections integrally united each having a straight profile which approximates the ideal curve of equal resistance to bending for its diameter and length and which varies from said curve essentially in enlargement of each end of each of said half sections.

EMIL H. PIRON.

REFERENCES CITED

The following references are of record ni the file of this patent:

UNITED STATES PATENTS

| Number | Name | Date |
|---|---|---|
| 233,222 | Findlay | Oct. 12, 1880 |
| 451,206 | Bristow | Apr. 28, 1891 |
| 1,253,975 | Howard et al. | Jan. 15, 1918 |
| 1,560,565 | Graham | Nov. 10, 1925 |
| 2,295,270 | Piron | Sept. 8, 1942 |